United States Patent
Lipman

(10) Patent No.: US 6,805,651 B2
(45) Date of Patent: Oct. 19, 2004

(54) VEHICLE TRANSMISSION SYSTEMS

(75) Inventor: John Michael Lipman, Ettington (GB)

(73) Assignee: Ricardo MTC Limited (GB)

( * ) Notice: Subject to any disclaimer, the term of this patent is extended or adjusted under 35 U.S.C. 154(b) by 0 days.

(21) Appl. No.: 10/333,805

(22) PCT Filed: Jul. 16, 2001

(86) PCT No.: PCT/GB01/03203

§ 371 (c)(1),
(2), (4) Date: May 29, 2003

(87) PCT Pub. No.: WO02/09966

PCT Pub. Date: Feb. 7, 2002

(65) Prior Publication Data

US 2004/0029673 A1 Feb. 12, 2004

(30) Foreign Application Priority Data

Jul. 27, 2000 (GB) .............................. 0018509

(51) Int. Cl.$^7$ ................. F16H 48/06; F16H 37/08; F16H 3/44; F16H 57/08
(52) U.S. Cl. ................. 475/221; 475/205; 475/284; 475/339
(58) Field of Search .............. 475/339, 275, 475/284, 221, 201, 204–206

(56) References Cited

U.S. PATENT DOCUMENTS

| 3,733,928 A | * | 5/1973 | Uozumi et al. | ............. | 475/284 |
| 4,612,824 A | * | 9/1986 | Ruhle | ................ | 475/221 |
| 6,120,407 A | * | 9/2000 | Mimura | ................ | 475/221 |

FOREIGN PATENT DOCUMENTS

| DE | 004041898 A1 | * | 7/1991 | ............ | 475/205 |
| EP | 0 413 436 A1 | | 2/1991 | ......... | B60K/17/346 |
| EP | 0 424 054 A2 | | 4/1991 | ......... | B60K/17/346 |
| JP | 405288248 A | * | 11/1993 | ............ | 475/275 |

OTHER PUBLICATIONS

PCT International Search Report dated Oct. 15, 2001, 6 pages.

* cited by examiner

Primary Examiner—Roger Pang
(74) Attorney, Agent, or Firm—Osha & May L.L.P.

(57) ABSTRACT

A transmission system for a four wheel drive vehicle includes an input shaft (2) connected to a differential mechanism (4, 6, 10), which has two output shafts (12, 20), which are connected, in use, to respective pairs of driven wheels of the vehicle. The two output shafts carry first and second coaxially mounted sun wheels (S1, S2, respectively), of an epicyclic gear system which mesh with first and second sets of planet wheels (P1, P2, respectively), the epicyclic gear system including a third sun wheel (S3), which is mounted coaxially with the first and second sun wheels and is in mesh with a third set of planet wheels (P3). The gear ratios of the three meshing sun wheels and sets of planet wheels are different.

4 Claims, 2 Drawing Sheets

VEHICLE TRANSMISSION SYSTEMS

The present invention relates to vehicle transmission systems and is concerned with transmission systems for four wheel drive vehicles.

BACKGROUND OF INVENTION

Automotive differentials are of course well known and include a single input shaft, normally connected to the output shaft of the vehicle gearbox, and two output shafts which are permitted to rotate at different speeds. The mean of these two speeds is directly proportional to the input speed. When a vehicle travels on a radius, that is to say goes round a corner, the outer wheels travel further than the inside wheels in the same time and must therefore rotate faster. The basic differential caters for this speed difference but the torque supplied to both wheels remains the same. However, there are many circumstances in which it is desirable for the torque supplied to the two wheels to differ. Thus if one wheel is on a low friction surface, e.g. ice, and the other on a high friction surface, e.g. a dry patch of roadway, the maximum torque that can be transmitted to the two wheels by a conventional differential is limited to the very low torque value which may be transmitted to that wheel which is in contact with the ice. The potential propulsive force available through the wheel in engagement with the high friction surface cannot be used and the propulsive force exerted may therefore be insufficient to move the vehicle. A vehicle cornering with a high lateral acceleration has a significant weight transfer from the inside wheels onto the outer wheels. As a result of the reduced weight on the inside wheels, only a low torque can be transmitted through the inside driven wheel before wheel slip occurs and this means that, with a conventional differential, only the same low torque may be transmitted to the outer driven wheel. This severely limits the potential acceleration of the vehicle, when cornering. In order to overcome these disadvantages, numerous devices are known to lock or limit slip in the differential, whereby different levels of torque may be transmitted through the two output shafts.

In the case of a four wheel drive vehicle, there is conventionally a differential between the front and rear axles to accommodate the speed differences between them whilst transmitting power to both axles. In this case also there are many circumstances under which a simple differential is inadequate. A four wheel drive facility is generally provided on vehicles with an excess of power and superior performance could therefore be achieved by transmitting the maximum amount of power through all the wheels. The maximum rate of acceleration can only be achieved if the torque is proportioned between the wheels to match the weight distribution of the vehicle. As a result of dynamic weight transfer, e.g. under heavy acceleration, as much as 80% of the weight may be carried by the rear wheels. An unequal torque distribution could be achieved by providing a differential with an invariable torque split to match this proportion but when cornering or driving on an icy road this torque split ratio could result in vehicle instability and thus loss of control. Under these conditions it would be advantageous for a higher proportion of the torque to be provided to the front axle.

In the case of "off road" vehicles, which frequently have a short wheel base and a high centre of gravity, the weight transfer when climbing a steep gradient could be as much as 90% onto the rear axle. A limited slip type of differential could deliver sufficient traction but could also cause slippage of the front wheels, thereby leading to loss of stability. Locking the centre differential, that is to say the differential between the front and rear axles, would prevent front wheel slip but reduces manoeuvrability which is a significant problem on the poor surfaces which are commonly encountered when driving off road.

When descending a steep gradient, the safest technique is to use a low gear ratio and rely solely or principally on engine braking to maintain control. Under these circumstances, the weight transfer that occurs may place as much as 90% of the vehicle weight onto the front axle.

It is therefore the object of the invention to provide a transmission system for four wheel drive vehicles which will split the engine torque between the front and rear axles in a proportion which is variable in dependence on one or more operating parameters of the vehicle or its engine rather than merely limiting the slip of or locking the differential.

BRIEF SUMMARY OF THE INVENTION

According to the present invention, there is provided a transmission system for a four wheel drive vehicle including an input shaft connected to a differential mechanism, which has two output shafts, which are connected, in use, to respective pairs of driven wheels of the vehicle, the two output shafts carrying first and second coaxially mounted sun wheels, respectively, of an epicyclic gear system which mesh with first and second sets of planet wheels, respectively, the epicyclic gear system including a third sun wheel, which is mounted coaxially with the first and second sun wheels and is in mesh with a third set of planet wheels, the gear ratios of the first sun wheel with the first set of planet wheels, the second sun wheel with the second set of planet wheels and the third sun wheel with the third set of planet wheels being different, each first planet wheel being connected to respective second and third planet wheels to rotate therewith about a respective common planet shaft, the planet shafts being connected to a common carrier which is rotatably mounted coaxially with the first, second and third sun wheels, the carrier being connected to a first selectively operable speed changing device, the third sun wheel being connected to a second selectively speed changing device, the transmission system further including at least one sensor arranged to produce a signal indicative of an operating parameter of the vehicle or its engine and a controller connected to the sensor and to the two speed changing device and arranged to operate the speed changing devices in response to the said signal. The present invention also embraces a four wheel drive vehicle incorporating such a transmission system.

Thus a four wheel drive vehicle in accordance with the present invention will typically include not only a front differential splitting speed and/or torque between the two front driven wheels, a rear differential splitting speed and/or torque between the two rear driven wheels and a centre differential splitting speed between the front and rear axles but also an epicyclic gear system, which is connected to the two outputs of the centre differential and includes two speed changing devices which are actuated by a controller in response to a signal received from one or more sensors which detect respective operating parameters of the vehicle or its engine to split the engine torque between the front and rear axles in a proportion which is the optimum for the prevailing operating conditions.

Thus in the transmission system in accordance with the invention there are two speed changing devices which are arranged to change the speed of the carrier and the third sun wheel, respectively, thereby varying the proportion of the engine torque supplied to the front and rear axles of the vehicle. The speed changing means may be arranged to increase or decrease the speed of the carrier and the third sun wheel. They may therefore constitute e.g. electric motors. It is, however, preferred that the speed changing devices are arranged to reduce the speed of rotation of the carrier and the third sun wheel and may thus constitute simple braking mechanisms. It is, however, preferred that they constitute clutches.

Further features and details of the invention will be apparent from the following description of two specific embodiments of transmission systems in accordance with the invention which is given by way of example only with reference to the two accompanying highly diagrammatic drawings.

DETAILED DESCRIPTION OF THE INVENTION

Figure 1:
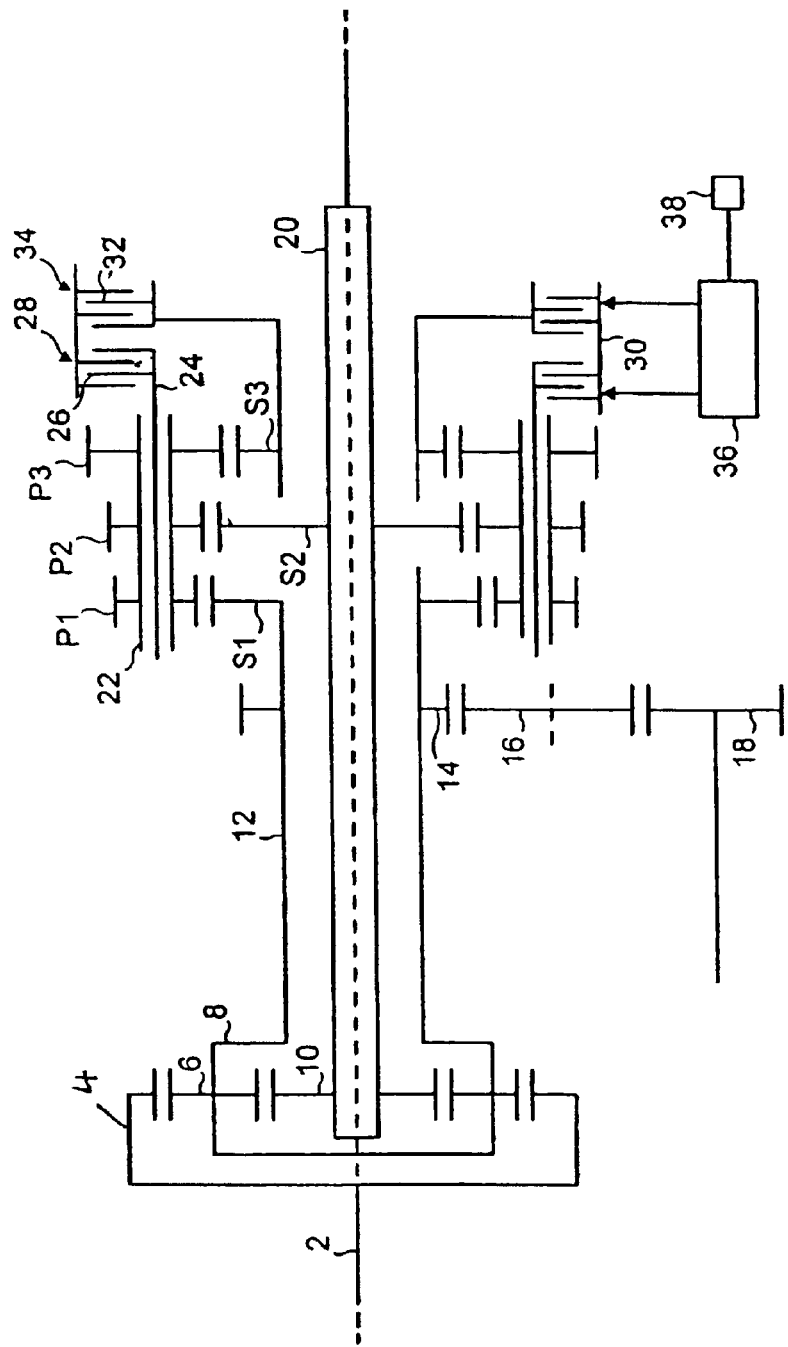
FIG. 1 Transmission with "north-south" configuration.

FIG. 1 shows a transmission system with an input shaft 2 which, in use, will be connected to or constitute part of the output from the gearbox of the vehicle engine. The shaft 2 is connected to the annulus 4 of an epicyclic differential. Formed on the interior of the annulus 4 is an annular array of gear teeth with which the teeth on a number of planet gears 6 mesh. The planet gears 6 are carried by a common carrier 8 and mesh with a sun gear 10. The carrier 8 is connected to a first hollow output shaft 12 which is connected to the front axle of the vehicle, not shown, by way of a gear train 14, 16, 18. The sun gear 10 is carried by a shaft 20 which is connected to the rear axle, typically through the rear differential.

The output shafts 12 and 20 are connected to a further epicyclic differential gear system which splits the torque transmitted through the two output shafts in a manner appropriate to the operating conditions of the vehicle. The front wheel output shaft 12 carries a sun gear SI and the rear wheel output shaft 20 carries a coaxial sun gear S2. Mounted concentrically with these two sun gears is a further sun gear S3. The three sun wheels S1, S2 and S3 are in mesh with respective sets of three planet wheels P1, P2 and P3. The various planet wheels are associated with one another in three groups, each group including a first planet wheel P1, a second planet wheel P2 and a third planet wheel P3, connected together to form a composite unit. Each composite planet unit P1, P2, P3 is mounted to rotate about a respective planet shaft 22. The three planet shafts 22, which extend parallel to the output shafts 12 and 20, are connected to a common carrier 24. Projecting radially from the carrier 24 are one or more radial clutches 26 which constitute one half of a first selectively actuable clutch 28, referred to as the rear bias clutch, the other half of which constitutes or is connected to a fixed structure 30, e.g. the outer casing of the epicyclic torque splitting differential system.

The sun gear S3 is also connected to one or more radial clutch discs 32 which constitute one half of a second selectively operable clutch 34, referred to as the front bias clutch, the other half of which is also connected to or constituted by the fixed structure 30.

The two clutches 28, 34 are connected to a power source (not shown) and may be operated independently under the control of an electronic controller 36. Connected to the controller is a plurality of sensors, of which only one, 38, is shown schematically arranged to sense, and produce a signal representative of, a number of operating parameters of the vehicle and/or its engine, such as the vehicle speed, the steering wheel angle, the acceleration of the vehicle in each of three orthogonal directions, engine speed, engine torque, yaw rate, which engine gear is engaged, the differential output speed and torque supplied to the front axle and the differential output speed and torque supplied to the rear axle.

In a specific embodiment, the sun wheels S1, S2 and S3 had 23, 21 and 21 teeth, respectively, whilst each planet wheel P1, P2 and P3 had 12, 12 and 24 teeth, respectively. The gear ratios of each meshing sun wheel and set of planet wheels are therefore all different.

It will be appreciated that, in use, application of the front bias clutch 34 will slow the sun gear S3 which induces a ratio change across the sun gears S1 and S2, the ratio being (P2/S2)/(P1/S1). This in turn produces a torque transfer from the rear output shaft 20 to the front output shaft 12. When the rear bias clutch is applied the reverse occurs and the carrier 24 is slowed which induces a ratio change across the sun gears S1 and S2, the ratio being (P3/S3−P1/S1)/ (P3/S3−P2/S2). There is thus a torque transfer from the front output shaft 12 to the rear output shaft 20. This small ratio change produces a small tyre slip which is responsible for the torque difference between the axles. For example, a tyre slip difference of less than 0.5% produces a torque bias ratio of 11.5, i.e. 92% to one axle and 8% to the other (i.e. a bias ratio of 92/8). By using pre-programmed algorithms, the controller can proportion the torque between the front and rear axles to optimise the vehicle performance.

Figure 2:
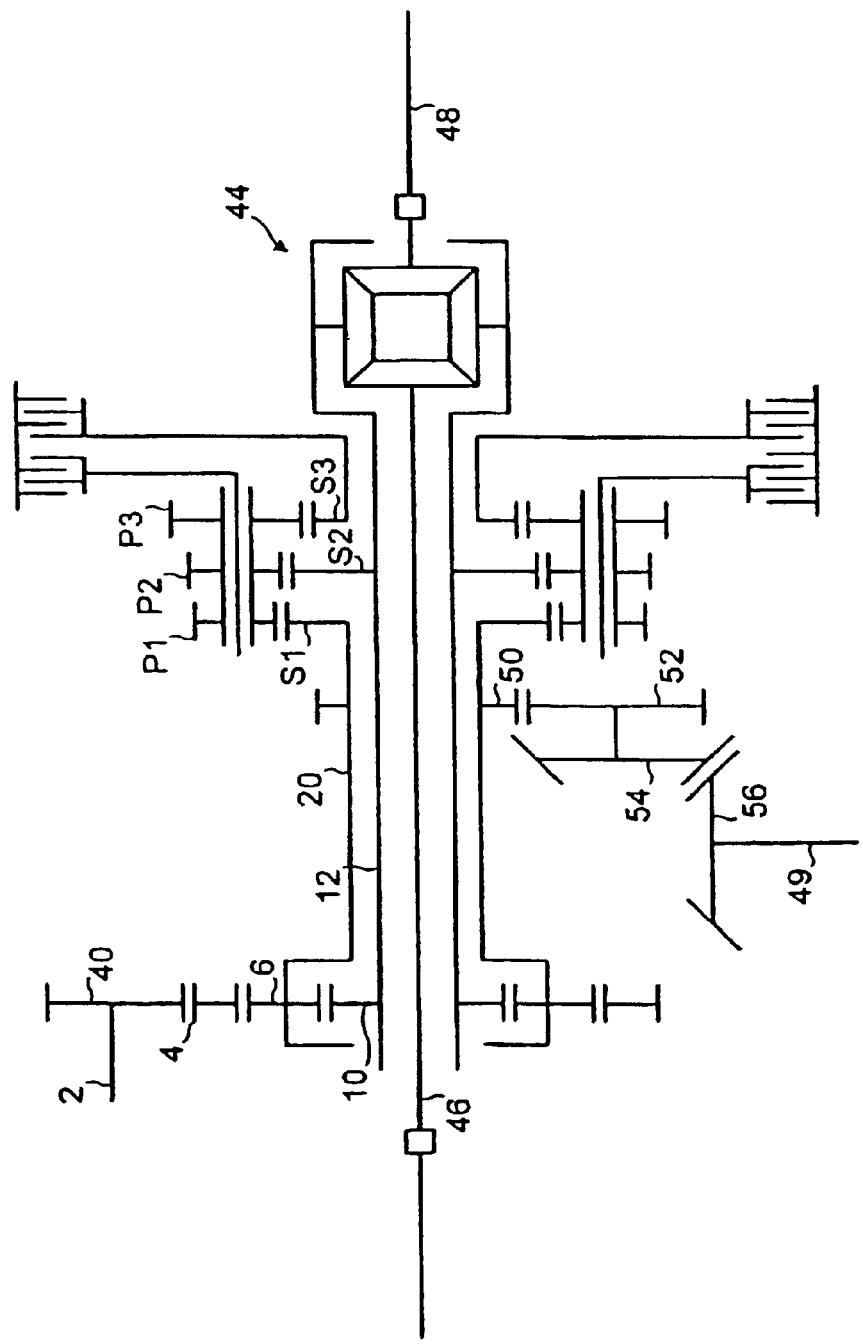
FIG. 2 Transmission with "east-west" configuration.

The transmission system described above has essentially a "north-south" configuration, that is to say the transmission input extends in the fore- and- aft direction of the vehicle parallel to the drive shaft to the front and rear axles. However, the present invention is also applicable to a transmission system of "east-west" configuration in which the transmission inlet shaft extends in the transverse direction of the vehicle perpendicular to the drive shaft to the rear axle. Such a transmission system is illustrated in FIG. 2, in which the same reference numerals as in FIG. 1 are used to designate similar components.

The transmission input shaft 2 transmits torque via gear wheel 40 to the annulus 4 of the centre epicyclic differential with which the teeth of a number of planet wheels 6 mesh. The output shaft 12 for the front wheels is connected to rotate with the sun wheel 10 and is connected to a standard differential 44 which splits the speed and/or torque between the output shafts 46 and 48 of the two driven front wheels. The output shaft 20 for the rear wheels is connected to the carrier of the planet wheels 6 and to the drive shaft 49 for the rear wheels via gear wheels 50, 52, 54 and 56. In other respects, the construction of this embodiment is the same as that of the first embodiment described above in connection with FIG. 1 and will therefore not be described again.

It will be appreciated that the ability to vary the split of torque between the front and rear axles of a four wheel drive vehicle in accordance with operating conditions, particularly in accordance with the division of the vehicle weight between the front and rear axles, will produce numerous advantages. These include maximising the potential acceleration of the vehicle by continuously varying the distribution of the torque between the front and rear axles to match the distribution of the static and dynamic weight of the vehicle between those axles. The ability of the vehicle to ascend or descend a gradient, either forwards or backwards, may be optimised by varying the distribution of torque between the front and rear axles to match the weight distribution. The cornering performance of the vehicle may also be optimised by varying the torque distribution between the front and rear axles to optimise the tyre slip angle, the side forces and the traction characteristics whilst entering, passing through and leaving a corner. The vehicle stability may also be maximised, especially under high speed and adverse weather conditions.

Although only the front or rear bias clutch would be engaged at any one time, it is also possible to engage both clutches simultaneously and this will effectively lock the centre differential and constitute an anti-theft device for the vehicle or provide a "hill hold" facility. The controller may be arranged to release both the clutches once the input torque exceeds the sum of the wind-up torque holding the front and rear axles. Immediately after release of the clutches, the controller may be arranged to apply the rear bias clutch to direct torque preferentially to the rear axle, if appropriate. This facility is, however, not required when the vehicle is facing downhill, unless reverse gear is selected.

Due to the fact that a significant proportion of the weight of a vehicle is shifted forwardly onto the front axle during braking, the front wheel brakes of a vehicle need to have a performance capability of e.g. two to three times that of the rear wheel brakes. However, it will be appreciated that the ability of the transmission system in accordance with the present invention to transfer torque between the front and rear axles under drive conditions can be used to transfer torque between the two axles under braking conditions also. This facility will enable the rear brakes to be sized to match the front brakes, which is currently not necessary, and thus enable the vehicle to achieve a substantially enhanced braking capability by comparison with known vehicles.

What is claimed is:

1. A transmission system for a four wheel drive vehicle including an input shaft connected to a differential mechanism, which has two output shafts, which are connected, in use, to respective pairs of driven wheels of the vehicle, the two output shafts carrying first and second coaxially mounted sun wheels, respectively, of an epicyclic gear system which mesh with first and second sets of planet wheels, respectively, the epicyclic gear system including a third sun wheel, which is mounted coaxially with the first and second sun wheels and is in mesh with a third set of planet wheels, the gear ratios of the first sun wheel with the first set of planet wheels, the second sun wheel with the second set of planet wheels and the third sun wheel with the third set of planet wheels being different, each first planet wheel being connected to respective second and third planet wheels to rotate therewith about a respective common planet shaft, the planet shafts being connected to a common carrier which is rotatably mounted coaxially with the first, second and third sun wheels, the carrier being connected to a first selectively operable speed changing device, the third sun wheel being connected to a second selectively speed changing device, the transmission system further including at least one sensor arranged to produce a signal indicative of an operating parameter of the vehicle or its engine and a controller connected to the sensor and to the two speed changing devices and arranged to operate the speed changing devices in response to the said signal.

2. A transmission system as claimed in claim 1 in which the first and second speed changing devices are arranged to reduce the speed of rotation of the carrier and the third sun wheel, respectively.

3. A transmission system as claimed in claim 2 in which the first speed changing device comprises a clutch, one side of which is connected to the carrier and the other side of which is connected to a fixed structure, and the second speed changing device comprises a clutch, one side of which is connected to the third sun wheel and the other side of which is connected to a fixed structure.

4. A transmission system as claimed in claim 1 in which the differential mechanism comprises an epicyclic gearset including an annulus in mesh with a set of planet wheels, which are carried by a carrier and are also in mesh with a sun wheel, the carrier and the sun wheel being connected to the two output shafts.

* * * * *